Dec. 6, 1966
R. P. EAGLES
3,289,635
MOUTH ACTUATED ANIMAL WATERING DEVICE
Filed March 26, 1965
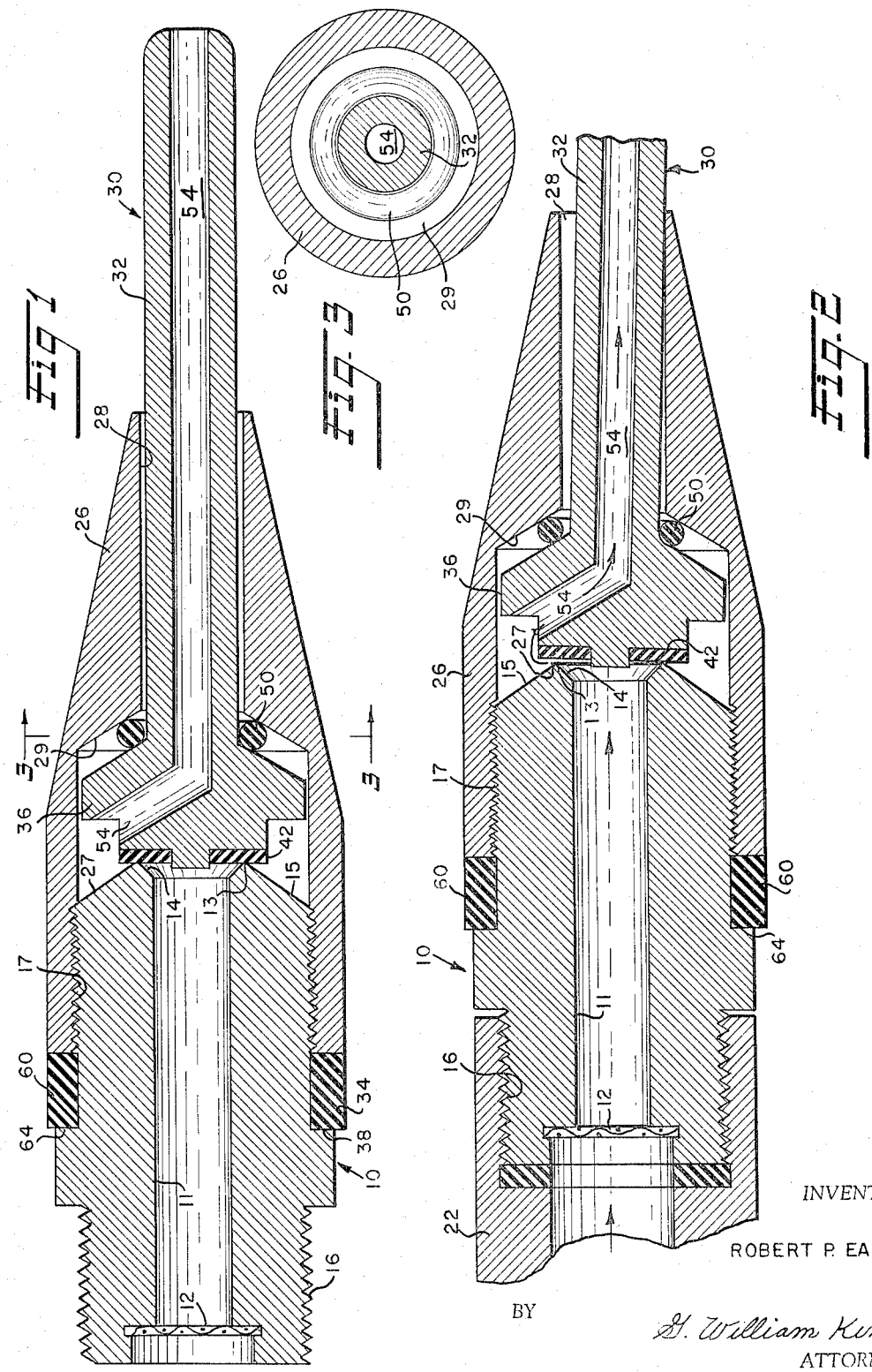
INVENTOR
ROBERT P. EAGLES
BY
G. William King
ATTORNEY

3,289,635
MOUTH ACTUATED ANIMAL WATERING DEVICE

Robert P. Eagles, Richmond, Va., assignor to A. H. Robins Company, Incorporated, Richmond, Va., a corporation of Virginia
Filed Mar. 26, 1965, Ser. No. 442,985
6 Claims. (Cl. 119—72.5)

This invention relates to a device for watering animals, and more particularly to an animal watering device containing an easily operable valve.

It is essential that the small animals such as mice, rats, guinea pigs, cats and the like, be provided with a very low pressure water source, metered in quantities the animal is capable of consuming without spilling. It is also essential that the device used for watering be capable of closing automatically after delivering the amount of water desired by the animal. Previously known animal watering devices of which I am aware are shown in U.S. Patents 1,918,566, 3,008,451 and 3,128,745. Due to the low water pressure systems involved in watering small animals, it is difficult to seat watering valves by forces created by such pressures. Consequently, in prior are watering systems such as cited above, leakage has frequently occurred, thereby producing unsanitary conditions and defeating their commercial success. In the case of animals being kept under surveillance and testing in laboratories, for example, such conditions are abhorred.

Briefly, in accordance with the present invention, an animal-activated watering device is provided with a sensitive valve capable of delivering small quantities of water under low pressure to animals, and automatically sealing and discontinuing such delivery. The valve in the watering device of the present invention does not close by water pressure, but rather, is continually, positively urged toward a closed position. However, the valve is constructed so that the positive closing force may be overcome and water released according to the adjustment of the valve, e.g., which increases or decreases the external force required to operate it, thus making it possible to operate efficiently without inadvertent water delivery according to the size and strength of the particular animals or group of animals desired to be watered.

It is therefore a primary object of the present invention to provide a watering device for animals, particularly small animals, which contains a normally closed animal-operated valve. Further objects of the present invention are to provide a watering device containing a very sensitive valve capable of adjustment to water animals of various sizes, to provide a watering device containing a normally closed valve which is easily operated by small animals and yet provides quantities of water capable of being consumed by the small animal without spilling, and to provide a watering device having all the foregoing objects and yet being inexpensive to produce.

Other objects and advantages of the present invention will become apparent to those skilled in this art from the following description of the best mode of carring out this invention, taken in connection with the accompanying drawing, wherein:

FIGURE 1 is a cross section view through the center of the watering device of the present invention in its normally closed state;

FIGURE 2 is a cross section view of the watering device of the present invention substantially as shown in FIGURE 1, but showing the position of the various parts as water flows therethrough; and FIGURE 3 is a cross section view taken substantially along line 1—1 of FIGURE 1.

Referring now to the drawing, the animal watering device of the present invention is comprised of a valve body indicated generally as 10 having a central borehole 11 extending therethrough. A screen 12 or other filter device is located at the water inlet end of the valve body, while a valve seat 13 is located at the other end of borehole 11, formed by converging surfaces 14 and 15 of the valve body. Valve body 10 has tapered pipe threads 16, and threads 17 adapting the valve body to sealingly engage an inlet water pipe 22 and an annular sleeve member 26. Sleeve 26 has an enlarged, threaded, open end, which forms a valve chamber 27, receiving valve body 10 and permitting the latter to be adjusted longitudinally therein without breaking the sealing effect of the threaded engagement. A valve stem borehole 28, of less diameter than chamber 27, extends from the chamber through the remainder of sleeve 26. A shoulder 29 on the inside wall of sleeve 26 defines the front wall of chamber 27 and the transition in diameter between the latter and borehole 28. Thus, as shown in FIGURES 1 and 2, valve chamber 27 is defined by the end of valve body 10 having valve seat 13 thereon, shoulder 29, and the inner wall of sleeve 26.

A valve stem indicated generally as 30 extends through sleeve bore 28 into valve chamber 27 and is comprised of a feeding tube 32, and a valve head 36 of larger diameter than borehole 28 and preferably having a surface 38 substantially parallel with shoulder 29 as shown in FIGURES 1 and 2. A valve closure seal 42 is located on the end of valve body 10 facing valve seat 13. The closure seat, which is preferably hard rubber, polyethylene, Teflon, or the like material, is adapted to sealingly engage valve seat 13 and prevent water from passing it. The valve seat, having a sharp outer edge formed by converging surfaces 14 and 15, is particularly suited for the valve mechanism since it will form an effective seal with valve closure seal 42, and yet, may be unsealed slightly to permit a trickle of water to flow through the entire device, by only slight movement of valve stem 30, as shown in FIGURE 2, the arrows illustrating the water flow path.

A resilient seal ring 50 (preferably rubber or other conventional O-ring material) is positioned between valve head 36 and sleeve shoulder 29. A water passageway 54 extends through valve head 36 and feeding tube 32, and delivers water to the animal as the feeding tube is moved to the position shown in FIGURE 2. Ring 50 provides a seal between valve head 36 and shoulder 29 to prevent passage of fluid from the valve chamber except through passageway 54. In addition, ring 50 has several other very important functions. First, it urges valve head 36 and consequently valve closure seal 42 against valve body 10, to normally close valve seat 13. Such a normal, positive closure position of the valve head, against water pressure helps the valve respond sensitively to movement of valve stem 30, even by slight forces applied thereto by very small animals. On the other hand, positive valve close is achieved by direct application of force rather than by reliance upon water pressure as in prior art devices. Ring 50 also properly spaces valve head 36 from the inner walls of sleeve 26 so that movement of feeding tube 30 by an animal in virtually any direction except inward direction toward valve body 10, results in a slight opening between valve closure seal 42 and valve seat 13, permitting water to trickle into the valve chamber, and then through passageway 54 to the animal.

Although low water pressures are required in the case of watering animals, to permit them to drink without spilling water and promoting unsanitary conditions, it is another advantage of the watering device of this invention that high pressure can be turned on to overcome the normal closing force applied to valve head 36 by ring 50, and thereby flush the watering device.

By adjusting valve body 10 and sleeve 26 longitudinally with respect to each other by their threaded engagement, it is possible to adjust the watering device so that it is more suitable for larger or smaller animals, as the case may be. Thus, for animals such as mice, who are very weak and light-weight, it is desirable to adjust sleeve 26 to the right as shown in the drawing, so that less force is required to move feeding tube 32 to unseal a portion of valve closure seal 42 from seat 13. However, in the case of heavier animals such as dogs, it is desirable to tighten sleeve 26 to the left with respect to valve body 10 as shown in the drawing. This prevents inadvertent operation of the valve where an animal may, for example, brush or stand against the feeding tube without intending to drink. On the other hand, the larger animal is sufficiently strong to operate the valve in the manner intended. A compressed rubber stop ring 60 mounted in groove 64 in valve body 10 helps maintain the sleeve and valve body in their relative positions until positively adjusted by turning sleeve 26.

By providing a hollow (or tubular) feeding tube 32, water trickles through stem 30 to the animal's mouth. In the case of young animals, this is highly desirable, as their first instinct is to obtain liquids by a sucking action, and although it is possible to water the animals from a drinking device which has a stem about which liquids will flow, it is preferable to have the liquids flowing through a hollow tube.

From the foregoing it can be seen that the animal watering device of the present invention may be operated by an animal touching feeding tube 32, thereby moving the latter in borehole 28 to a position such as shown in FIGURE 2. As in FIGURE 2, valve closure seal 42 is removed slightly from valve seat 13 and an opening is created, permitting water to flow into valve chamber 27 and through passageway 54 to the animal.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as my invention is:

1. An animal watering device comprising a tubular sleeve having an enlarged open end forming a valve chamber, a borehole of less diameter than said valve chamber extending from said valve chamber end to the other end of said sleeve, an annular shoulder on the inside of said sleeve between said borehole and said valve chamber, a valve body having a borehole therethrough, extending into an end of, and sealingly engaged with, said sleeve, valve seat means located adjacent the end of said valve body borehole located in said sleeve, and means on said valve body for connecting the other end of said valve body borehole to a source of water, a valve stem in said sleeve and comprising an elongated feeding tube extending from outside said sleeve inwardly through said sleeve borehole and into said valve chamber, said feeding tube being of less diameter than the diameter of said sleeve borehole to permit at least slight lateral movement of the feeding tube therein, a valve head on said valve stem in said valve chamber, said valve head being of greater width than the internal diameter of said annular shoulder and having a valve seal means thereon contacting said valve seat, a water passageway extending through said valve head and said valve stem, and resilient means located between and engaging said annular shoulder and said valve head urging said valve seal means into normally closed, sealing engagement with said valve seat.

2. An animal watering device as defined in claim 1 further comprising means for adjusting the extent to which said valve body extends into said sleeve, to thereby regulate the force required to be applied to said feeding tube to unseat said valve closure means from said valve seat.

3. An animal watering device comprising a valve body, a tubular sleeve having a borehole extending therethrough of relatively large diameter in one end section thereof, said valve body engaged in said end section, an annular shoulder projecting into said borehole from the inside wall thereof, said large diameter borehole section, the side of said shoulder facing said section and said valve body defining a valve chamber, a valve stem comprising an elongated feeding tube extending from outside the other end of said sleeve into said valve chamber, a valve head on said valve stem in said valve chamber, said valve head being of greater width than the annulus formed by said annular shoulder, a passageway extending from said valve chamber through said valve head and feeding tube, and valve means in said valve chamber comprising an inlet bore extending through said valve body to said valve chamber, a valve seat on said valve body in said valve chamber adjacent said inlet bore, a valve closure seal contacting said valve seat, fixed to said valve head, and resilient means located between and engaging said annular shoulder and said valve head urging said valve closure seal into normally closed, sealing engagement with said valve seat, said resilient means forming a seal between said valve chamber and the other end of said sleeve borehole.

4. An animal watering device as defined in claim 3 wherein said valve body extends into said sleeve and is engaged thereto by threaded attachment for relative longitudinal adjustment movement between said sleeve and said body.

5. An animal watering device as defined in claim 3 wherein said resilient means is adapted to space said valve head at least slightly from the wall of said valve chamber defined by the large diameter section of said sleeve borehole, to permit said valve closure seal to move from its sealing engagement with said valve seat.

6. An animal watering device comprising a tubular sleeve, a tubular valve body located in one end of said sleeve, a valve seat on said valve body, a tubular valve stem extending through the other end of said sleeve and having a valve closure seal on the end thereof engaging said valve seat, and a resilient seal ring located in said sleeve sealing the annulus formed between said stem and the inner wall of the other end of said tubular sleeve, said seal ring constituting means for urging said valve seat and valve closure seal into sealing engagement and spacing said stem from said inner wall whereby said sealing engagement may be broken by slight movement of said stem.

References Cited by the Examiner

UNITED STATES PATENTS

| | | | |
|---|---|---|---|
| 2,486,729 | 11/1949 | Beckley | 119—72.5 |
| 2,510,252 | 6/1950 | Pine | 119—72.5 |
| 2,710,594 | 6/1955 | Thompson | 119—72.5 |
| 3,008,451 | 11/1961 | Curry | 119—72.5 |
| 3,191,622 | 6/1965 | Finlayson | 251—354 |
| 3,228,377 | 1/1966 | Grassano | 251—149 X |

SAMUEL KOREN, *Primary Examiner.*

ALDRICH F. MEDBERRY, *Examiner.*